(12) United States Patent
Lim et al.

(10) Patent No.: US 11,927,984 B2
(45) Date of Patent: Mar. 12, 2024

(54) ELECTRONIC APPARATUS

(71) Applicant: Lenovo (Beijing) Limited, Beijing (CN)

(72) Inventors: Ghwang-Hyun Lim, Beijing (CN); Cuong Truong, Cary, NC (US); Matthew Tucker, Chapel Hill, NC (US)

(73) Assignee: LENOVO (BEIJING) LIMITED, Beijing (CN)

( * ) Notice: Subject to any disclaimer, the term of this patent is extended or adjusted under 35 U.S.C. 154(b) by 256 days.

(21) Appl. No.: 17/474,182

(22) Filed: Sep. 14, 2021

(65) Prior Publication Data

US 2022/0100231 A1 Mar. 31, 2022

(30) Foreign Application Priority Data

Sep. 30, 2020 (CN) .......................... 202011063037.0

(51) Int. Cl.
*G06F 1/16* (2006.01)

(52) U.S. Cl.
CPC ............ *G06F 1/1618* (2013.01); *G06F 1/166* (2013.01)

(58) Field of Classification Search
CPC ............................... G06F 1/1618; G06F 1/166
See application file for complete search history.

(56) References Cited

U.S. PATENT DOCUMENTS

| 578,325 | A | * | 3/1897 | Fleming | A47B 23/043 |
| | | | | | 248/456 |
| 11,079,794 | B2 | * | 8/2021 | Yoon | G06F 1/1616 |
| 2009/0174759 | A1 | * | 7/2009 | Yeh | H04N 7/148 |
| | | | | | 348/E7.078 |
| 2013/0128432 | A1 | * | 5/2013 | Lee | G06F 1/1632 |
| | | | | | 361/679.01 |
| 2013/0229100 | A1 | * | 9/2013 | Siddiqui | G06F 1/1662 |
| | | | | | 248/688 |
| 2014/0133689 | A1 | * | 5/2014 | Yu | H04R 1/025 |
| | | | | | 381/390 |
| 2019/0278324 | A1 | * | 9/2019 | Yoon | G06F 1/1616 |

FOREIGN PATENT DOCUMENTS

| CN | 2630918 Y | 8/2004 |
| CN | 1620239 A | 5/2005 |
| CN | 205485743 U | 8/2016 |

* cited by examiner

*Primary Examiner* — Adrian S Wilson
(74) *Attorney, Agent, or Firm* — ANOVA LAW GROUP, PLLC

(57) ABSTRACT

An electronic apparatus includes a support member, a first body, and a second body. The first body is of a plate shape and includes a first surface. A first I/O device is arranged on the first surface. The second body is of a plate shape. Ends of the first body and the second body are rotatably connected. In a first positional relationship, the first body and the second body are parallel to each other. In a second positional relationship, the first body and the second body form an angle. In a supported state, the first I/O device faces away from the second body, and the support member is between the first body and the second body to limit the first body from approaching the second body. In an unsupported state, the support member does not limit the first body from approaching the second body.

11 Claims, 7 Drawing Sheets

ELECTRONIC APPARATUS

CROSS-REFERENCE TO RELATED APPLICATION

This application claims priority to Chinese Patent Application No. 202011063037.0, filed on Sep. 30, 2020, the entire content of which is incorporated herein by reference.

TECHNICAL FIELD

The present disclosure generally relates to the electronic apparatus technology field and, more particularly, to an electronic apparatus.

BACKGROUND

An electronic apparatus, such as a laptop computer, does not have many support positions for its display. Thus, the electronic apparatus cannot satisfy a more diversified application need, such as when a user is drawing on the display.

SUMMARY

Embodiments of the present disclosure provide an electronic apparatus including a support member, a first body, and a second body. The first body is of a plate shape. The first body includes a first surface. A first I/O device is arranged on the first surface. The second body is of a plate shape. Ends of the first body and the second body are rotatably connected. The first body and the second body are relatively placed in a first positional relationship and in a second positional relationship. In the first positional relationship, the first body and the second body are parallel to each other. In the second positional relationship, the first body and the second body form an angle. The electronic apparatus includes a supported state and an unsupported state. In the supported state, the first I/O device faces away from the second body, and the support member is between the first body and the second body to limit the first body from approaching the second body. In the unsupported state, the support member does not limit the first body from approaching the second body.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

REFERENCE NUMERALS

1 First body, 2 First surface, 3 First I/O device, 4 Second body, 5 Second surface, 6 Support member, 7 Connection end, 8 Free end, 9 Accommodation space, 10 Locking space, 11 First portion, 12 Second portion, 13, First heat dissipation hole, 14, Second heat dissipation hole, 15 Digital pen, 16 Rotation shaft mechanism, 17 Storage groove.

DETAILED DESCRIPTION OF THE EMBODIMENTS

The present disclosure provides an electronic apparatus, which includes a variety of support positions to satisfy more diversified application needs of a user.

Technical solutions of embodiments of the present disclosure are clearly described below in connection with the accompanying drawings of embodiments of the present disclosure. Described embodiments are merely some embodiments of the present disclosure rather than all embodiments. Based on embodiments of the present disclosure, all other embodiments obtained by those of ordinary skill in the art without creative work are within the scope of the present disclosure.

As shown in FIGS. 1-9, embodiments of the present disclosure provide an electronic apparatus. The electronic apparatus includes an electronic apparatus, which may include a state of being supported for use, such as a notebook computer, a dual-screen apparatus, etc. The electronic apparatus includes a first body 1 and a second body 4. The first body 1 is of a plate shape. That is, the first body 1 may include a plate-shaped member. A first I/O device 3 may be arranged at a first surface 2 of the first body 1 (the first surface 2 may be one of surfaces of the plate-shaped first body 1 with a largest area). This first I/O device 3 may include an input function for inputting information to the electronic apparatus (e.g., a touch panel, a drawing pad, a keyboard, etc.), or an output function of outputting information of the electronic apparatus (e.g., a speaker, a display screen, etc.), or a component that may include both functions (e.g., a touch screen, etc.), that is, "I" may indicate either "or" or "and."

Figure 8:
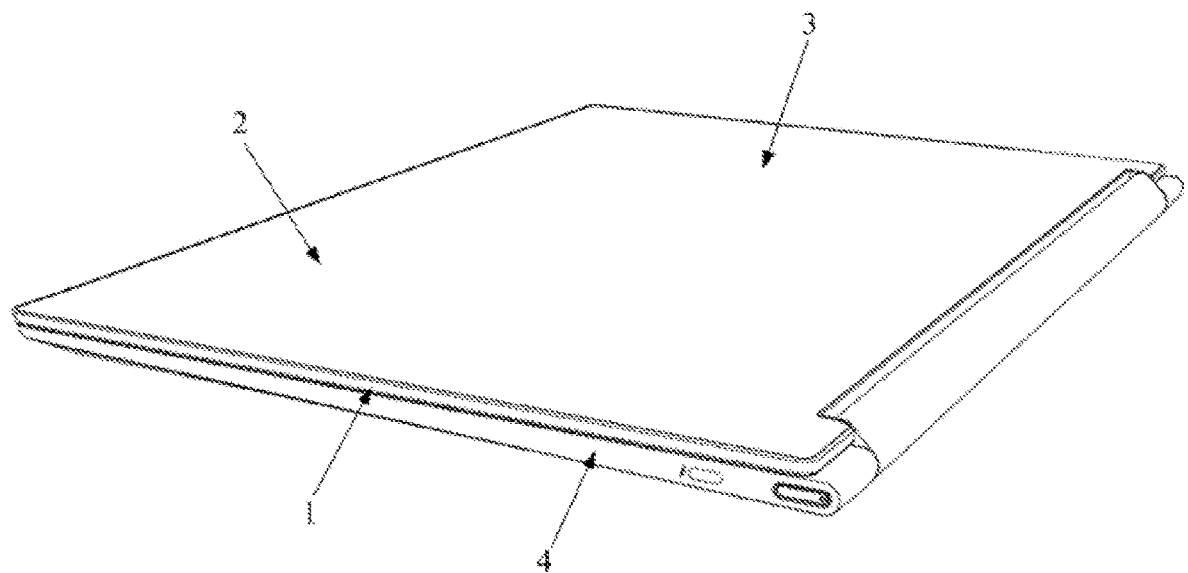
FIG. 8 illustrates a schematic structural diagram of the electronic apparatus in a first situation when a first body and a second body are in a first position relationship according to some embodiments of the present disclosure.
Figure 9:
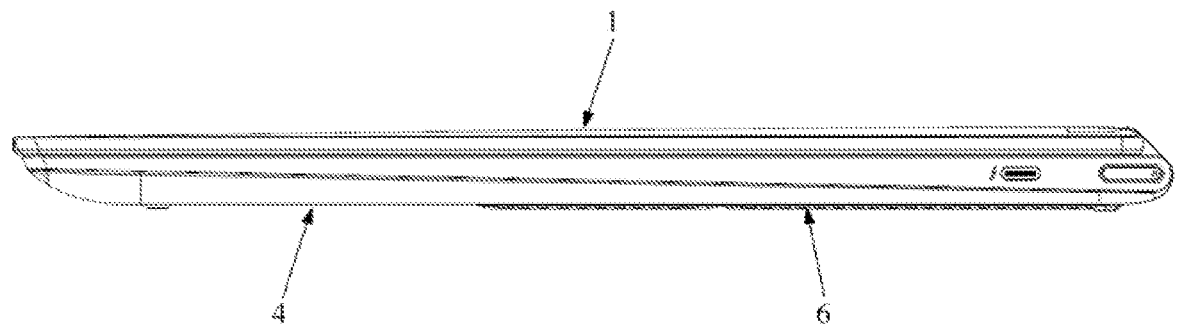
FIG. 9 illustrates a schematic structural diagram of the electronic apparatus in a second situation when a first body and a second body are in a first position relationship according to some embodiments of the present disclosure.
Figure 10:
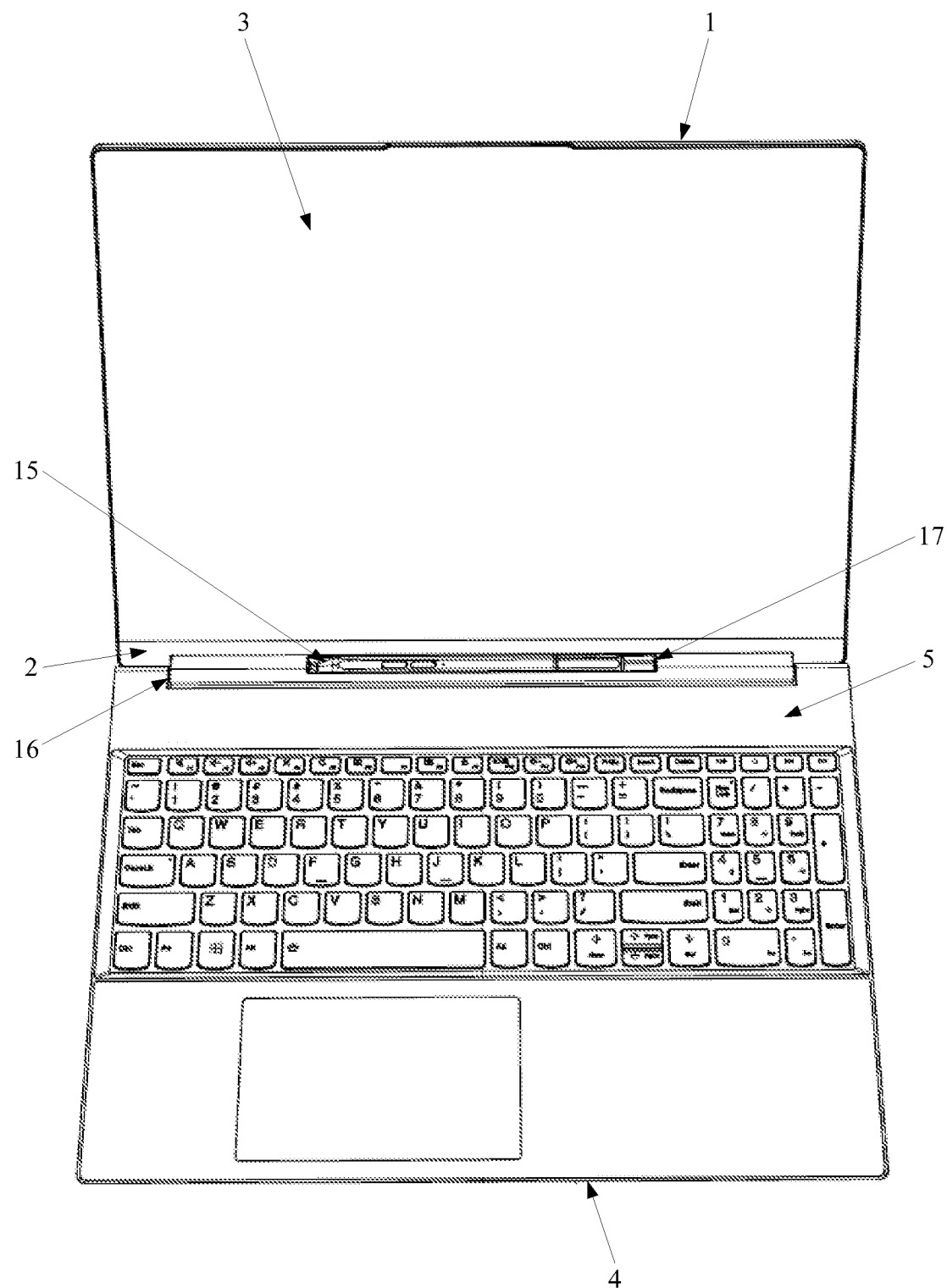
FIG. 10 illustrates a schematic structural diagram showing a digital pen arranged in a storage groove according to some embodiments of the present disclosure.

In the present disclosure, the I/O device 3 may include a touch screen capable of inputting and displaying traces. The I/O device 3 may further include a touch screen that is a full screen as shown in FIG. 8 (i.e., the first surface 2 in FIG. 8, which is a surface of the first I/O device 3). In some embodiments, as shown in FIG. 10, the touch screen may also be a non-fullscreen. The second body 4 may be also of the same plate shape as the first body 1. An end of the second body 4 and an end of the first body 1 may be rotatably connected. Thus, the first body 1 and the second body 4 may rotate relative to each other and have a plurality of different positional relationships. A second I/O device may be arranged on a second surface 5 of the second body 4 (the second surface 5 may be one of surfaces of the plate-shaped second body 4 with a largest area). The second I/O device may also include the functions of the first I/O device 3 and be a same type of device as the first I/O device 3. As shown in FIG. 8, the first surface 2 and the second surface 5 may be parallel to and face away from each other in a first positional relationship. As shown in FIG. 9, the first surface 2 and the second surface 5 may be parallel and face to each other in a second positional relationship. In some embodiments, the second body 4 may not include the second I/O device.

The plurality of different positional relationships may include at least a first positional relationship and a second positional relationship. In the first positional relationship, the first body 1 and the second body 4 may be parallel to each other. That is, the plate-shaped first body 1 and the plate-shaped second body 4 may be parallel to each other, or approximately parallel to each other (i.e., a small included angle may exist between the first body 1 and the second body 4, e.g., an included angle of 0° to 5°). In some embodiments, when the first body 1 and the second body 4 are placed in the first positional relationship, different situations may also exist. In a first situation, as shown in FIG. 8, while the first body 1 and the second body 4 are parallel, the I/O device 3 faces away from the second body 4 (i.e., a position where the first I/O device 3 is located is on a surface of the first body 1 away from the second body 4). For example, a notebook computer may be rotated for 360°. In a second situation, as shown in FIG. 9, while the first body 1 and the second body 4 are parallel, the first I/O device 3 faces the second body 4 (i.e., a position where the first I/O device 3 is located is on a surface of the first body 1 close to the second body 4). For example, the notebook computer is at 0°. Thus, the first positional relationship may include the first situation, or the second situation, or both the first situation and the second situation.

In the second positional relationship, the first body 1 and the second body 4 may meet an included angle condition. That is, an included angle may exist between the first body 1 and the second body 4 (the included angle may not include 0° and 360°). Based on above, the electronic apparatus of the present disclosure may also include a supported state and an unsupported state. In the supported state, the first I/O device 3 may face away from the second body 4, and the first body 1 and the second body 4 may be placed in the second positional relationship. The support member 6 (the support member 6 may include a member capable of supporting the first body 1 and/or the second body 4, which will be described later) may be between the first body 1 and the second body 4. Thus, the support member 6 may provide a support function. Therefore, the support member 6 may limit the first body 1 from approaching the second body 4. Thus, the first body 1 and the second body 4 cannot be transformed from the second positional relationship to the first positional relationship. In the unsupported state, the support member 6 may no longer provide the support function. Thus, the support member 6 may no longer limit the first body 1 from approaching the second body 4. Therefore, the first body 1 and the second body 4 may be transformed from the second positional relationship to the first positional relationship.

The electronic apparatus may realize the transformation between the first positional relationship and the second positional relationship through the relative rotation between the first body 1 and the second body 4. The electronic apparatus may be in the supported state. As shown in FIGS. 1-6, when the first body 1 and the second body 4 are in a situation that the first I/O device 3 faces away from the second body 4 in the second positional relationship, the first body 1 rotates relative to the second body 4 for an angle greater than 180°. When the user is performing operations such as drawing or touching on the first I/O device 3, the second body 4 may be attached to a desktop. Thus, and the first body 1 may be supported by the support member 6 obliquely. The first I/O device 3 may face the user sitting at the table. Then, the user may perform operations such as drawing and touching on the first I/O device 3 obliquely supported. Through such an arrangement, the electronic apparatus may at least include a supported position when the first I/O device 3 faces away from the second body 4. Thus, the electronic apparatus may include more supported positions, and the supported positions of the electronic apparatus may be enriched to meet the more diversified application needs of the user.

Figure 1:
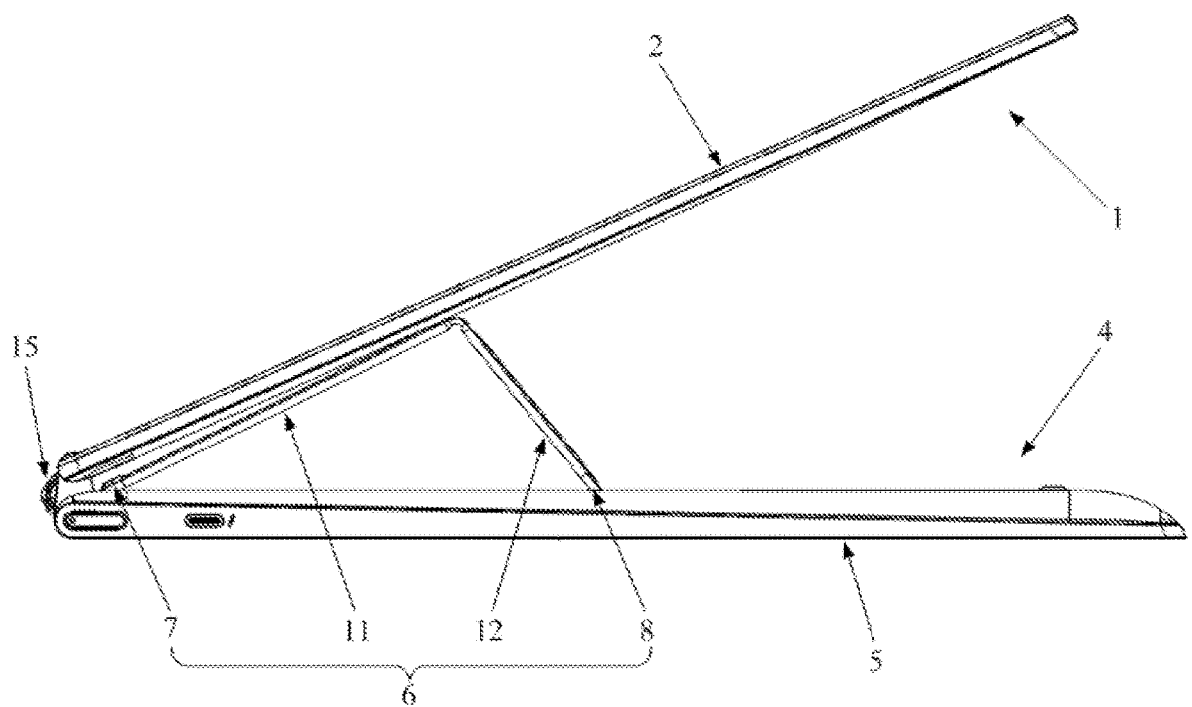
FIG. 1 illustrates a schematic side-view diagram showing an electronic apparatus in a support state from a support angle according to some embodiments of the present disclosure.

The electronic apparatus of the present disclosure may include a support member 6. The support member 6 may be connected to a setting surface. The setting surface may include a surface of the first body 1 facing the second body 4 in the supported state or a surface of the second body 4 facing the first body 1 in the supporting state. The support member 6 for supporting the first body 1 and/or the second body 4 may be arranged on the first body 1 or the second body 4. In the present disclosure, the surface of the first body 1 or the second body 4, which is provided with the support member 6, may be referred to as the setting surface. That is, the support member 6 may be connected to the setting surface. The setting surface may include a surface of the first body 1 or a surface of the second body 4. As shown in FIG. 1, when the setting surface includes the surface of the first body 1, the surface is the surface of the first body 1 facing the second body 4 in the supported state (when the electronic apparatus is in the supported state, the first body 1 and the second body 4 are placed in the second positional relationship), that is, the surface opposite to the first surface 2. As shown in FIG. 1, when the setting surface includes the surface of the second body 4, the surface is the surface of the second body 4 facing the first body 1 in the supported state, that is, and the surface opposite to the second surface 5.

Figure 2:
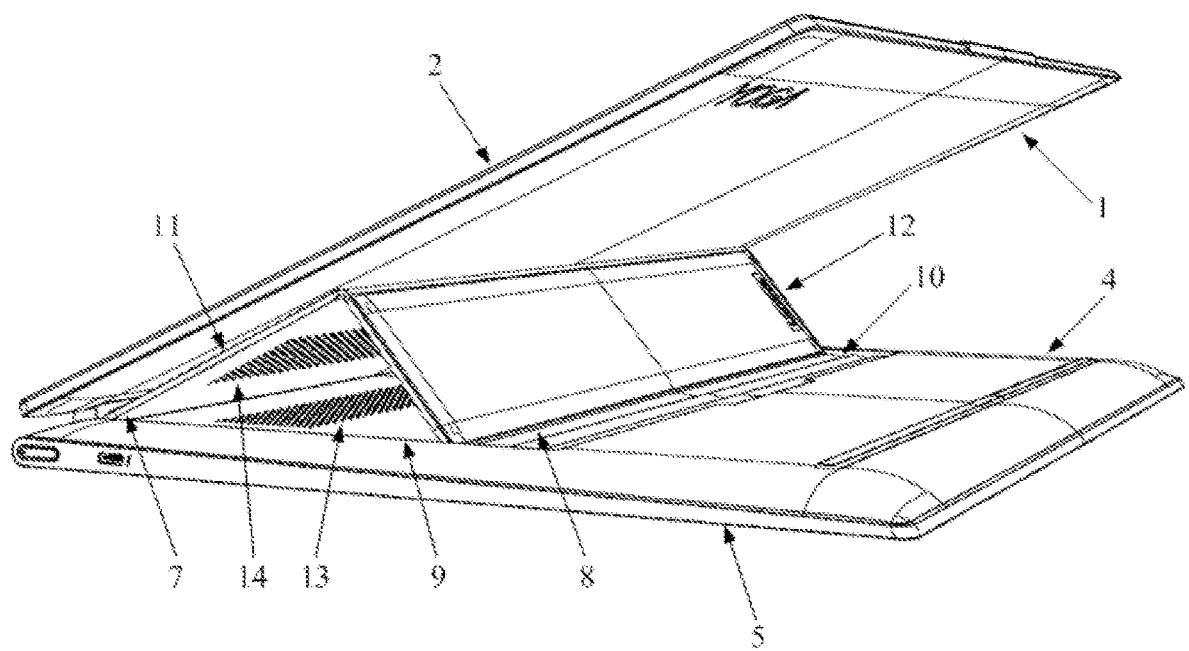
FIG. 2 illustrates a schematic axonometric view diagram of a structure shown in FIG. 1.
Figure 7:
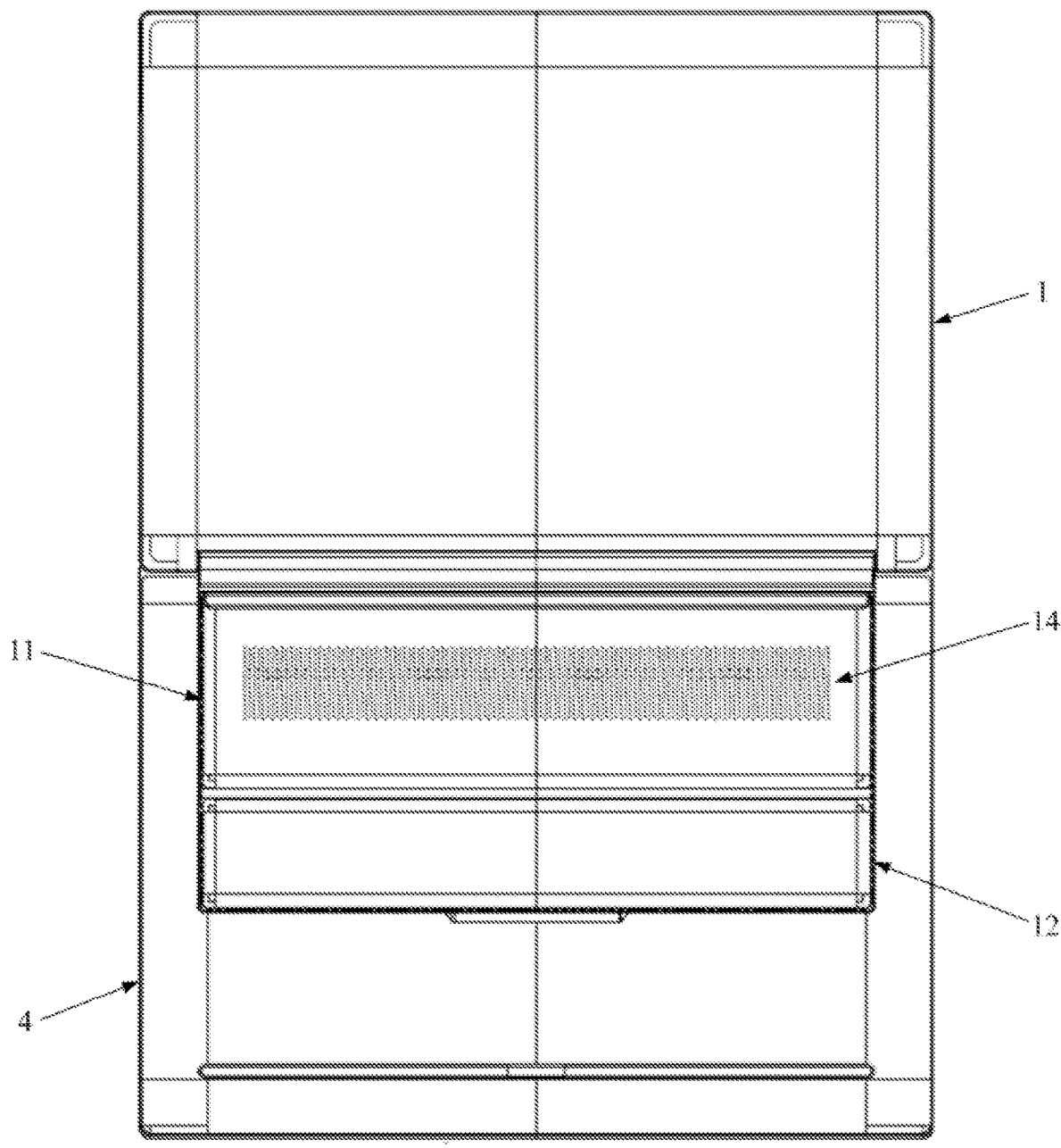
FIG. 7 illustrates a schematic structural diagram showing an appearance of the electronic apparatus according to some embodiments of the present disclosure.

In some embodiments, as shown in FIGS. 1 and 2, the support member 6 includes a connection end 7 and a free end 8 opposite to each other. The connection end 7 is located on the setting surface. In the supported state, the free end 8 is located on a support surface. In the present disclosure, an end connected to the setting surface may be defined as the connection end 7, and another end of the support member 6 may be defined as the free end 8. In the supported state, that is, when the support member 6 supports the first body 1 or the second body 4, the free end 8 may be located on the support surface. In the unsupported state, that is, when the support member 6 does not support the first body 1 or the second body 4, the free end 8 may be separated from the support surface and move freely. The surface in contact with the free end 8 in the supported state may be referred to as the support surface. In some embodiments, the support member 6 may be a plate-shaped member. In some other embodiments, as shown in FIG. 7, the support member includes a rectangular plate-shaped member. Thus, the support member 6 may include the same shape as the first body 1 and the second body 4. The connection end 7 and the free end 8 may refer to two parallel edges of the rectangular plate-shaped member. Base on the above, an area of the support member 6 may be smaller than an area of the setting surface. Thus, the angle between the first body 1 and the second body 4 may be relatively small in the supported state. Therefore, the user may operate the first I/O device 3 more comfortably.

When the support member 6 includes a different structure, a supporting form of the support member 6 may also be different. Thus, the support surface in contact with the free end 8 may also change. For example, the support surface may be the setting surface. That is, two ends of the support member 6 may be located on a same surface, or as shown in FIGS. 1 to 6, the support surface is the surface of the other body, to which the setting surface faces, in the supported state. That is, the support surface may be an opposite surface of the first surface 2 or an opposite surface of the second surface 5.

In some embodiments, as shown in FIG. 2, the setting surface includes an accommodation space 9. In the unsupported state, the support member 6 may be at least partially accommodated in the accommodation space 9 (e.g., the opposite surface of the second surface 5 is referred to as the setting surface to embody the accommodation space 9 in the accompanying drawings of the present disclosure). In the supported state, the support member 6 may support the first body 1 or the second body 4. In the unsupported state, the support member 6 may no longer support the first body 1 or the second body 4. The first body 1 and the second body 4 may transform to the first positional relationship. Thus, the first body 1 and the second body 4 may be parallel to each other. The parallel form may be storage and carrying forms of the electronic apparatus. That is, the user may make the first body 1 and the second body 1 parallel to each other when storing and carrying the electronic apparatus. Thus, the support member 6 may be hidden in the parallel form to avoid the increase in a thickness of the electronic apparatus due to the additional support member 6. Therefore, an impact on the storage and carrying of the electronic apparatus may be avoided. Based on this, the accommodation space 9 is provided on the setting surface. When the support member 6 does not provide the support function, the support member 6 may be accommodated in the accommodation space 9 to achieve the effect of reducing the thickness of the electronic apparatus, which not only makes the electronic apparatus portable, but also makes an appearance of the electronic apparatus more aesthetic. A flatness of the surface of the electronic apparatus may also be improved to a certain degree. In some embodiments, the accommodation space 9 is formed by opening a groove on the setting surface.

Further, as shown in FIG. 2, the support surface includes at least two locking spaces 10. In the supported state, the free end 8 may extend into different locking spaces 10 to change a support angle between the first body 1 and the second body 4. In the present disclosure, the end of the first body 1 and the end of the second body 4 are rotatably connected. The relative rotation angle of the first body 1 and the second body 4 is greater than 180° in the supported state. The support member 6 is located between the first body 1 and the second body 4. Thus, the support member 6 and the supported body may form a herringbone structure to support the body. Therefore, if a position where the free end 8 contacts the support surface changes, an inclination angle of the support member 6 may be changed. Thus, the supporting angle between the first body 1 and the second body 4 may be changed. To improve support stability of the support member 6 to the first body 1 or the second body 4, the locking space 10 cooperating with the free end 8 may be arranged on the support surface. When the free end 8 enters the locking space 10, the locking space 10 may block the free end 8 to realize the positioning of the free end 8. Thus, the sliding of the free end 8 when the free end is in contact with the flat support surface may be avoided, the support stability may be improved, and the support angle may be better maintained. At least two locking spaces 10 may be arranged on the support surface. That is, a plurality of locking spaces 10 may be arranged. The locking spaces 10 may be made to be farther and farther away from a rotation axis of the first body 1 and the second body 4. Thus, the inclination angle of the support member 6 may change when the free end 8 enters different locking spaces 10. Then, the included angle between the first body 1 and the second body 4 (that is, the support angle) may change. Therefore, by arranging the plurality of locking spaces 10 on the support surface and enabling the free ends 8 to enter different locking spaces 10, the included angle between the first body 1 and the second body 4 may be adjusted in the supported state. Therefore, the user may choose an appropriate support angle to facilitate performing a drawing operation more comfortably. In some embodiments, the locking spaces 10 may be formed by opening grooves on the support surface.

In some embodiments, the connection end 7 may be rotatably connected to the setting surface. That is, the support member 6 may be always connected to the setting surface. An operation of switching between the supported state and the unsupported state may be realized by rotating the support member 6. In some embodiments, the support member 6 may be rotated to tilt relative to the setting surface. Then, the support member 6 may be brought into contact with the other body to support the body connected to the support member 6 or the other body. At this point, the electronic apparatus may be in the supported state. When the support member 6 is rotated to make the plate-shaped support member 6 attached to the setting surface (as shown in FIG. 7), the support member 6 may be no longer in contact with the other body. Thus, the support to the body connected to the support member 6 or the other body may be removed. At this point, the electronic apparatus may be in an unsupported state. The adjustment of the support angle may also be achieved by rotating the support member 6. Compared to switching the state, the rotation angle of the support member 6 may only need to be reduced when the support angle is adjusted.

In addition, in some embodiments, in another connection manner, the support member 6 may be detachably connected to the setting surface. That is, the setting surface may include a first connection structure (e.g., a slot, a snap slot). The connection end 7 may include a second connection structure (e.g., a plug, a hook) matching with the first connection structure. When the support member 6 is connected to the setting surface through the cooperation of the first connection structure and the second connection structure, the support member 6 that is tilted relative to the setting surface may provide the support function to cause the electronic apparatus to be in the supported state. When the support member 6 is separated from the setting surface, the member, which may limit the first body 1 and the second body 4 from approaching to each other, may no longer exist between the first body 1 and the second body 4. The first body 1 and the second body 4 may be transformed into the first positional relationship. The electronic apparatus may be in the unsupported state at this point. In embodiments of the present disclosure, to make the operation of switching the states easier and easier to implement, the support member 6 and the setting surface may be connected and separated by plugging and unplugging.

When the connection end 7 is rotatably connected to the setting surface, the connection end 7 may be connected to the setting surface through a rotation shaft (not shown in the figure), or the connection end 7 may be flexibly connected to the setting surface to make the setting surface a flat surface. That is, the connection structure of the support member 6 and the setting surface may also include a plurality of types. In some embodiments, the connection end 7 and the setting surface may be rotatably connected through the rotation shaft. In the connection structure, since the connection end 7 is an edge of a rectangle, the connection end 7 may be arranged along an axial direction of the rotation shaft when the connection end 7 is connected to the rotation shaft. In some embodiments, the rotation shaft may be arranged parallel to the rotation shaft in a rotation shaft mechanism 16, through which the first body 1 and the second body 4 may be rotatably connected. In some other embodiments, in a connection structure, the connection end 7 and the setting surface may be connected by a flexible material. An advantage of the connection structure may include that the rotatable connection of the connection end 7 and the setting surface may be realized by folding and bending the flexible material (e.g., cloth, leather, rubber, etc.) without a specific rotation component. The flexible material may not occupy extra space. Thus, the setting surface may still be maintained as a flat surface.

In some embodiments, the plate-shaped support member 6 may include a multi-layer structure in a thickness direction. The multi-layer structure may include a first flexible layer, a second flexible layer, and a rigid layer. As shown in FIG. 7, when the support member 6 is attached to the setting surface (i.e., in the unsupported state), the first flexible layer includes a layer that is attached to the setting surface. In some embodiments, a material of the first flexible layer may include suede. The suede may include good flexibility. The suede may be softly attached to a rigid housing of the electronic apparatus, which forms the setting surface and may prevent the rigid housing from being damaged, such as scratches. The suede may also reduce noise generated by attaching the support member 6 to the housing rapidly and strongly. Thus, the performance of the electronic apparatus may be enhanced.

The second flexible layer may be stacked and arranged on a side of the first flexible layer away from the setting surface. That is, the second flexible layer may include a layer that forms an outer surface of the support member 6. The second flexible layer may be a surface component of an outer surface of the electronic apparatus when the support member 6 is attached to the setting surface. When the support member 6 supports the first body 1 or the second body 4, the second flexible layer may be in contact with a supported one of the first body 1 and the second body 4. The second flexible layer may include good flexibility, an aesthetic appearance, and a good feel to improve the quality of the electronic apparatus. To improve the support stability, the second flexible layer may also include a large friction coefficient. In some embodiments, the second flexible layer may include genuine leather.

The rigid layer may include a component that maintains the supporting strength of the support member 6. The rigid layer may be only arranged at a first portion 11 and a second portion 12. The rigid layer may not be arranged at the connection end 7, the free end 8, and the connection position where the first portion 11 and the second portion 12 are rotatably connected. The connection end 7, the free end 8, and the connection position may only include the first flexible layer and the second flexible layer. Thus, the first portion 11 may be rotatably connected to the setting surface, and the first portion 11 and the second portion 12 may be rotatably connected. Thus, the support member 6 may normally support the first body 1 or the second body 4. In some embodiments, the rigid layer may be arranged between the first flexible layer and the second flexible layer and may be wrapped by the first flexible layer and the second flexible layer to avoid exposing the rigid layer to the outside. In some embodiments, by ensuring sufficient support strength, the rigid layer may include a plate-shaped member made of aluminum alloy. Due to low mass of aluminum alloy, using the aluminum alloy may reduce the weight of the support member 6 and the entire electronic apparatus.

Figure 3:
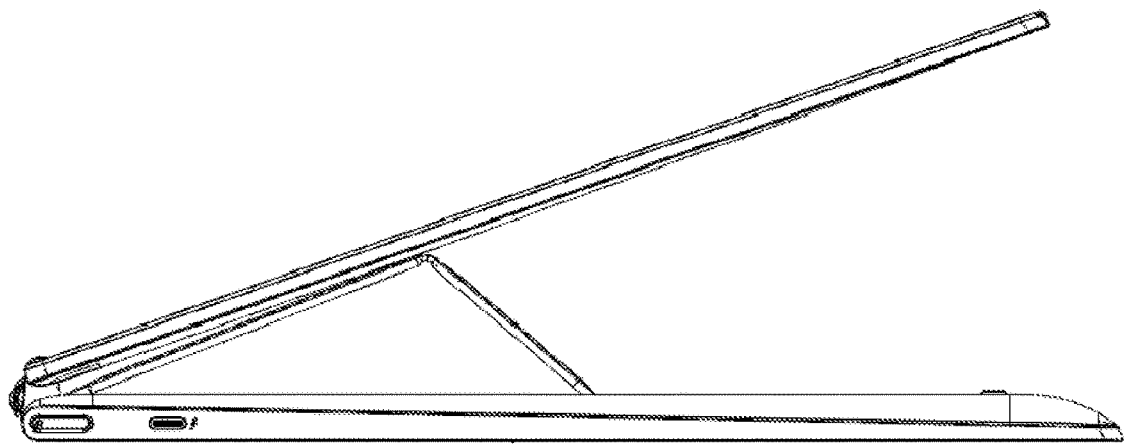
FIG. 3 illustrates a schematic side-view diagram showing an electronic apparatus in the support state from another support angle according to some embodiments of the present disclosure.
Figure 4:
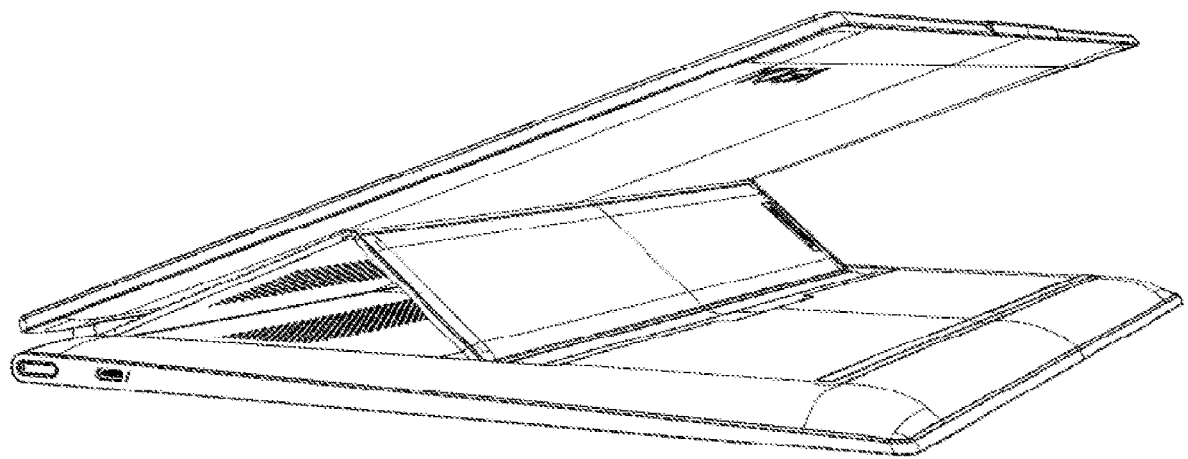
FIG. 4 illustrates a schematic axonometric view diagram of a structure shown in FIG. 4.
Figure 5:
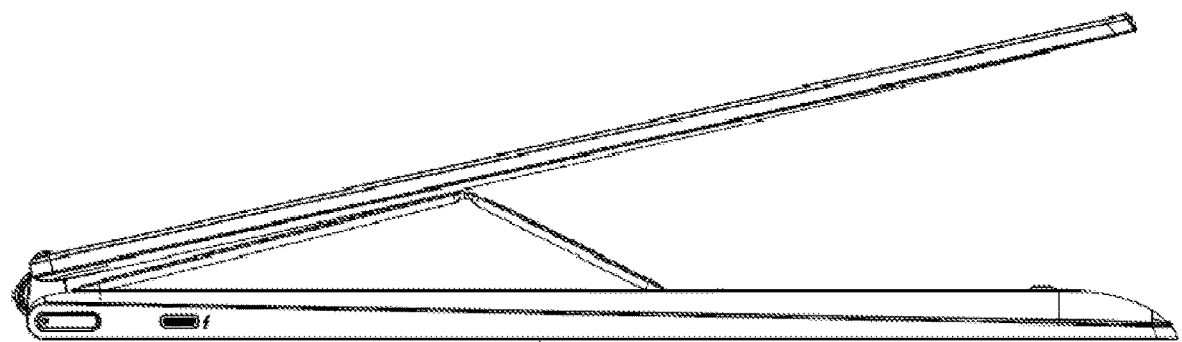
FIG. 5 illustrates a schematic side-view diagram showing an electronic apparatus in the support state from another support angle according to some embodiments of the present disclosure.
Figure 6:
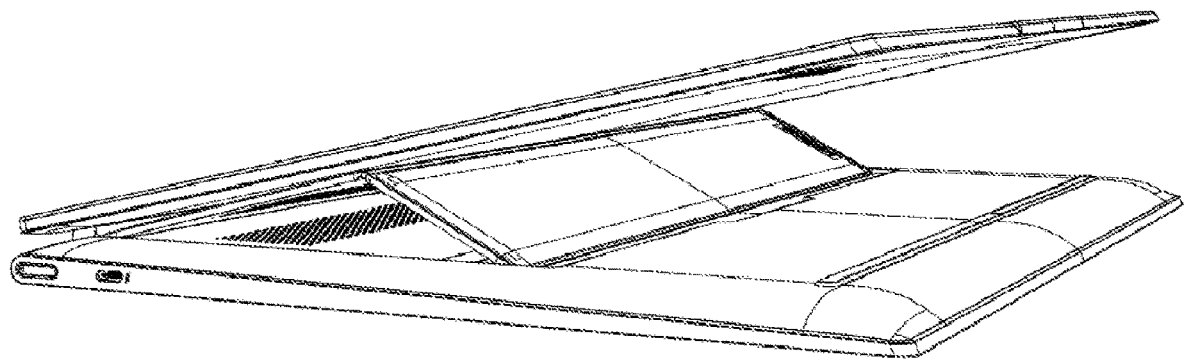
FIG. 6 illustrates a schematic axonometric view diagram of a structure shown in FIG. 5.

In some embodiments, as shown in FIGS. 1 to 6, an overall structure of the support member 6 may also include different options. In a first structure, the support member 6 may include the first portion 11 with the connection end 7 and the second portion 12 with the free end 8. The first portion 11 and the second portion 12 may be rotatably connected. The support surface is the setting surface. That is, in the supported state, the first portion 11 abuts against the surface of the other body faced by the setting surface. The free end 8 abuts against the setting surface. In the structure, the accompanying drawings of the present disclosure may take the opposite surface of the second surface 5 as the setting surface as an example to describe the support member 6 of the structure. To facilitate description, the content of this paragraph also takes the setting surface as the opposite surface (i.e., the support member 6 is arranged on the second body 4) of the second surface 5 as an example for description. As shown in FIGS. 1, 2 and 7, the connection end 7 is arranged to be parallel and close to the rotation shaft mechanism 16. That is, the first portion 11 is arranged close to the rotation shaft mechanism 16, and the second portion 12 is arranged away from the rotation shaft mechanism 16. When the support member 6 supports the first body 1, the first portion 11 may be rotated around the connection end 7 to be tilted relative to the setting surface until the first portion 11 abuts against the opposite surface of the first surface 2. As the first portion 11 is tilted, the second portion 12 may be also tilted. In a process of tilting the second portion 12, the free end 8 of the entire support member 6 farthest from the rotation shaft mechanism 16 may approach the rotation shaft mechanism 16. The free end 8 may stop approaching the rotation shaft mechanism 16 when the first portion 11 abuts against the first body 1. Then, the free end 8 may enter the locking space 10 arranged on the support surface (the support surface is the setting surface) and be positioned by the locking space 10. Thus, the support member 6 may support of the first body 1. The electronic apparatus may be in the supported state. In the supported state, as shown in FIGS. 1, 3, and 5, a cross-section of the tilted support member 6 includes an inverted V-shape (the above herringbone structure and oblique support may refer to a support position of the second portion 12 to the first body 1 in the supported state). When the support angle needs to be adjusted, the free end 8 may just need to enter the different locking spaces 10. The support member 6 of the structure may support the first body 1 when the first portion 11 abuts against the first body 1. The first portion 11 and the first body 1 may be in surface contact, that is, the support member 6 of this structure and the first body may include a larger contact area when the support member 6 supports the first body 1. Thus, the stability for supporting the first body 1 may be significantly improved.

In this structure, the connection end 7 may be arranged as close to the rotation shaft mechanism 16 as possible. For example, the connection position between the connection end 7 and the setting surface may include an adjacent position of the rotation shaft mechanism 16. That is, a separation area may not exist between the connection position and the setting position of the rotation shaft mechanism 16 (i.e., a separation distance is zero). The connection end 7 and the rotation shaft mechanism 16 may be two structures that are close to each other. Thus, the first portion 11 and the first body 1 may include a larger contact area when the first portion 11 abuts against the first body 1. Therefore, the support stability may be greatly improved. When the setting surface is the opposite surface of the first surface 2, that is, when the support member 6 is connected to the first body 1, and when the support member 6 supports the second body 4, the supporting manner may be the same as the supporting manner of supporting the first body 1 above. The difference includes that the first portion 11 abuts against the second body 4 (the opposite surface of the second surface 5), and the free end 8 abuts against the opposite surface of the first surface 2, and the support position of the support member 6 (the cross-sectional shape of the tilted support member 6) is an inverted shape of the shapes shown in FIGS. 1, 3, and 5, that is, an upright V-shape (not shown in the figure). Similarly, in this situation, the connection end 7 may be also arranged as close to the rotation shaft mechanism 16 as possible on the opposite surface of the first surface 2. Thus, the first portion 11 and the second body 1 may include a larger contact area to greatly improve the support stability.

In some embodiments, in a second structure, the support member 6 may include an integral structural member with a fixed form. The support surface may include the surface of the other body faced by the setting surface in the supported state. In this structure, the supporting portion may no longer include the first portion 11 and the second portion 12 that can rotate relatively, but only include one of the first portion 11 and the second portion 12. In some embodiments, the support member 6 may include the second portion 12 (the second portion 12 is the only portion of the support member 6). The connection end 7 of the support member 6 may be directly and rotatably connected or detachably connected to the setting surface. When the support member 6 supports the first body 1 or the second body 4, the free end 8 of the support member 6 may be tilted relative to the setting surface through rotation, or the connection end 7 of the support member 6 may be inserted into the setting surface (meanwhile the free end 8 of the inserted support member 6 is tilted relative to the setting surface). The free end 8 may directly abuts against the support surface. The support surface may include the surface of the other body faced by the setting surface in the supported state. For example, when the setting surface includes the opposite surface of the first surface 2, the support surface may include the opposite surface of the second surface 5. The support position of the support member 6 of the second structure in the supported state may be the same as the support position of the second portion 12 in the first structure. Advantages may include that the structure may be simple, and the states may be conveniently switched.

The support member 6 may include the above-mentioned first portion 11 and the second portion 12. Since the setting surface includes the accommodation space 9, the setting surface may include at least two locking spaces 10. As shown in FIG. 10, all the locking spaces 10 connect with the accommodation space 9. That is, when the support member 6 supports the first body 1 or the second body 4, the setting surface and the support surface may include the same surface. Thus, the accommodation space 9 and the locking spaces 10 originally arranged on the setting surface and the support surface, respectively, may be located on the same surface. In embodiments of the present disclosure, to reduce the occupied area of the setting surface and ensure the normal support of the first body 1 or the second body 4, all the locking spaces 10 may connect with the accommodation space 9. In some embodiments, as shown in FIG. 2, the accommodation space 9 with a larger area is arranged on the setting surface by a grooving manner, and the plurality of locking spaces 10 with a smaller area are arranged on a bottom wall of the accommodation space 9 by a grooving manner.

In some embodiments, as shown in FIG. 2, the setting surface includes a first heat dissipation hole 13. The support member 6 includes a second heat dissipation hole 14. In the unsupported state, the support member 6 may cover the first heat dissipation hole 13, and the first heat dissipation hole 13 may dissipate heat through the second heat dissipation hole 14. In the supported state, the first heat dissipation hole 13 may be exposed and dissipate heat. In some embodiments, the setting surface may include the opposite surface of the second surface 5, that is, the surface of the second body 4 facing the first body 1 in the supported state. The first heat dissipation hole 13 of the electronic apparatus for dissipating internal heat may be arranged on the setting surface. In some embodiments, the first heat dissipation hole 13 may be arranged on the bottom wall of the accommodation space 9. Since the support member 6 is laid flat in the accommodation space 9 in the unsupported state, the support member 6 may cover the first heat dissipation hole 13. To avoid a situation that the heat of the electronic apparatus cannot be dissipated timely and effectively because the support member 6 covers the first heat dissipation hole 13, the second heat dissipation hole 14 may be arranged on the support member 6. In the unsupported state (i.e., the support member 6 is laid flat in the accommodation space 9), the second heat dissipation hole 14 is aligned and communicates with the first heat dissipation hole 13. Thus, the heat transferred by the first heat dissipation hole 13 may be dissipated through the second heat dissipation hole 14. As shown in FIG. 2, in the supported state, since the support member 6 is tilted relative to the setting surface and is no longer laid flat in the accommodation space 9, the support member 6 no longer covers the first heat dissipation hole 13. The first heat dissipation hole 13 is exposed to the outer surface of the electronic apparatus. The heat transferred by the first heat dissipation hole 13 may be directly dissipated.

In some embodiments, as shown in FIG. 10, the electronic apparatus further includes a digital pen 15 capable of inputting information to the first I/O device 3. A storage space is arranged on the rotation shaft mechanism 16 that rotatably connects the first body 1 and the second body 4. The digital pen 15 may be placed in the storage space. The storage space may be formed by opening a storage groove 17 on the rotation shaft mechanism 16. In the present disclosure, the above structure may be configured to support the first body 1 that includes the first I/O device 3 when the rotation angle of the first body 1 and the second body 4 is greater than 180°. With such support, the user may perform an operation on the first I/O device 3 on the first body 1 with a relatively large rotation angle more stably and conveniently. In some embodiments, the first I/O device 3 may include a touch screen. The user may perform a drawing operation on the touch screen through the digital pen 15. Thus, in addition to supporting the touch screen, the electronic apparatus may also include a full-size digital pen 15 and the storage space for storing the digital pen 15 on the electronic apparatus. Thus, the user may perform the drawing operation stably, conveniently, and comfortably by using the electronic apparatus of the present disclosure. With the storage space, the digital pen 15 may be conveniently stored and carried. The electronic apparatus may be used more effectively.

In the present specification, the structure of each part is described in a progressive manner. The structure of each part focuses on the difference from the existing structure. The overall and partial structure of the electronic apparatus may be obtained by combining the above-mentioned a plurality of parts.

The above description of embodiments of the present disclosure enables those skilled in the art to implement or use the present disclosure. Various modifications to embodiments of the present disclosure are obvious to those skilled in the art. The general principles defined in the present specification may be implemented in other embodiments without departing from the spirit or scope of the present disclosure. Therefore, the present disclosure is not limited to the embodiments shown in the present specification but should conform to the widest scope consistent with the principles and novel features disclosed in the present specification.

What is claimed is:

1. An electronic apparatus, comprising:
   a support member;
   a first body being of a plate shape and including a first surface, a first I/O device being arranged on the first surface; and
   a second body being of a plate shape, ends of the first body and the second body being rotatably connected, the first body and the second body being relatively placed in a first positional relationship and in a second positional relationship;
   wherein:
      in the first positional relationship, the first body and the second body are parallel to each other, the first positional relationship includes a first situation and a second situation, in the first situation, the first body and the second body are parallel to each other and the first I/O device faces away from the second body, and in the second situation, the first body and the second body are parallel to each other and the first I/O device faces the second body;
      in the second positional relationship, the first body and the second body form an angle;
      the electronic apparatus includes a supported state and an unsupported state;
      in the supported state, the first I/O device faces away from the second body, the support member is between the first body and the second body to limit the first body from approaching the second body, and the first body rotates relative to the second body for an angle greater than 180° in response to switching from the second situation of the first positional relationship to the supported state; and
      in the unsupported state, the support member does not limit the first body from approaching the second body.

2. The electronic apparatus of claim 1, wherein:
   the support member is connected to a setting surface, the setting surface being a surface of the first body facing the second body in the supported state or a surface of the second body facing the first body in the supported state.

3. The electronic apparatus of claim 2, wherein:
   the support member includes a connection end and a free end;
   the connection end is located at the setting surface;
   in the supported state, the free end is located at a support surface; and
   the support surface is the setting surface or a surface of the other body faced by the setting surface in the supported state.

4. The electronic apparatus of claim 3, wherein:
   the setting surface includes an accommodation space; and
   in the unsupported state, the support member is at least partially accommodated in the accommodation space.

5. The electronic apparatus of claim 3, wherein:
   the support surface includes at least two locking spaces; and
   in the supported state, the free end extends into different locking spaces to change a support angle between the first body and the second body.

6. The electronic apparatus of claim 3, wherein:
   the connection end is rotatably connected to the setting surface;
   the connection end is connected to the setting surface through a rotation shaft.

7. The electronic apparatus of claim 3, wherein:
   the connection end is flexibly connected to the setting surface, making the setting surface a flat surface.

8. The electronic apparatus of claim 3, wherein the support member includes:
   a first portion including the connection end; and
   a second portion including the free end, the first portion and the second portion being rotatably connected, and the support surface being the setting surface.

9. The electronic apparatus of claim 8, wherein in the supported state:
   the first portion abuts against a surface of the other body faced by the setting surface; and
   the free end abuts against the setting surface.

10. The electronic apparatus of claim 8, wherein:
    the setting surface includes an accommodation space; and
    the support surface includes at least two locking spaces; and
    all locking spaces connect with the accommodation space.

11. The electronic apparatus of claim 2, wherein:
    the setting surface includes a first heat dissipation hole;
    the support member includes a second heat dissipation hole; and
    in the unsupported state, the support member covers the first heat dissipation hole, and the first heat dissipation hole dissipates heat through the second heat dissipation hole, and in the supported state, the first heat dissipation hole is exposed and dissipates heat.

* * * * *